(12) United States Patent
Cheng et al.

(10) Patent No.: US 9,378,327 B2
(45) Date of Patent: Jun. 28, 2016

(54) CANONICAL FORMS OF LAYOUT PATTERNS

(71) Applicant: Mentor Graphics Corporation, Wilsonville, OR (US)

(72) Inventors: Wu-Tung Cheng, Lake Oswego, OR (US); Manish Sharma, Wilsonville, OR (US); Robert Brady Benware, Clackamas, OR (US); Robert Randal Klingenberg, Beaverton, OR (US)

(73) Assignee: Mentor Graphics Corporation, Wilsonville, OR (US)

(*) Notice: Subject to any disclaimer, the term of this patent is extended or adjusted under 35 U.S.C. 154(b) by 99 days.

(21) Appl. No.: 14/537,504

(22) Filed: Nov. 10, 2014

(65) Prior Publication Data

US 2015/0135151 A1   May 14, 2015

Related U.S. Application Data

(60) Provisional application No. 61/901,719, filed on Nov. 8, 2013.

(51) Int. Cl.
*G06F 9/455* (2006.01)
*G06F 17/50* (2006.01)

(52) U.S. Cl.
CPC ........ *G06F 17/5081* (2013.01); *G06F 2217/12* (2013.01); *Y02P 90/265* (2015.11)

(58) Field of Classification Search
USPC .................................................. 716/111, 51
See application file for complete search history.

(56) References Cited

U.S. PATENT DOCUMENTS

| 2002/0162081 | A1* | 10/2002 | Solomon ........................... 716/11 |
| 2004/0003357 | A1* | 1/2004 | Palusinski et al. ................ 716/5 |
| 2010/0306723 | A1* | 12/2010 | Abbaspour et al. ............... 716/6 |
| 2014/0026107 | A1* | 1/2014 | Bocharov et al. ............. 716/101 |

* cited by examiner

*Primary Examiner* — Brian Ngo

(57) ABSTRACT

Aspects of the disclosed technology relate to techniques for determining canonical forms of layout patterns. Coordinates of vertices of geometric elements in a window of a layout design are first transformed into new coordinates of the vertices, wherein the coordinates of vertices do not comprise clipped coordinates and the transforming comprises: performing a translation on the coordinates of vertices based on differences between maximum and minimum X/Y coordinate values of the vertices. Based on sums of X/Y coordinate values of the new coordinates of the vertices, a canonical form of the geometric elements is determined. The canonical form coordinates of the vertices may then be determined and sorted. The sorted canonical form coordinates may be employed for pattern matching.

18 Claims, 9 Drawing Sheets

Flow chart 600

CANONICAL FORMS OF LAYOUT PATTERNS

RELATED APPLICATIONS

This application claims benefit of U.S. Provisional Patent Application No. 61/901,719, filed on Nov. 8, 2013, which application is incorporated entirely herein by reference.

FIELD OF THE DISCLOSED TECHNOLOGY

The present disclosed technology relates to the field of lithography. Various implementations of the disclosed technology may be particularly useful for determining pattern optical similarity.

BACKGROUND OF THE DISCLOSED TECHNOLOGY

Designing and fabricating IC devices typically involves many steps, sometimes referred to as the "design flow." The particular steps of a design flow often are dependent upon the type of the circuit, its complexity, the design team, and the circuit fabricator or foundry that will manufacture the circuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, such as a register transfer level (RTL) description of the circuit. The logic of the circuit is then analyzed, to confirm that it will accurately perform the functions desired for the circuit. This analysis is sometimes referred to as "functional verification." After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing IC components (e.g., contacts, channels, gates, etc.) and place them in a design area. These groups of geometric elements may be custom designed, selected from a library of previously-created designs, or some combination of both. Lines, also represented by geometric elements, are then routed between the geometric elements for IC components, forming the wiring used to interconnect the electronic devices. Circuit layout descriptions can be provided in many different formats. Once the design is finalized, the layout portion of the design can be used by fabrication tools to manufacture the circuit using a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the design layout onto the substrate. Certain geometric shapes cannot be successfully manufactured in a particular manufacturing process. Historically, a chip manufacturer would have a failure analysis (FA) team identify these configurations, generate a geometric representation of the problematic features in those configurations, and then derive an engineering specification for excluding those problematic features from new designs. This type of engineering specification typically would be interpreted and formulated as a design rule. The derived design rule would then be added to the rule decks for use during a physical verification process.

Such a design rule checking (DRC) process works well when most problem features could be defined with simple one-dimensional checks (length, width, distance, etc.). More complex shapes, however, cannot be accurately described with existing scripting languages, inevitably resulting in checking errors. Moreover, significant time and expertise must be spent in the attempt to reach congruence between the original intent of the design rule and its implementation in a DRC process. Furthermore, as advanced nodes are being implemented, problematic configurations or patterns are now being identified by designers using lithography and optical process simulations well before silicon production and the creation of design rules. These designers also need the ability to capture and transfer problematic configurations to other designers.

To address the above challenges, pattern-aware physical verification techniques have been developed. These techniques are based more on original visual representation of a configuration and less on the abstraction and derivation. As a result, the process of defining a problematic configuration (pattern) in a layout design is dramatically simplified. Where pattern libraries have been established, pattern matching can be easily implemented into the layout verification flow for new designs, augmenting traditional design rule checking (DRC) and enabling designers to find and resolve more design issues earlier in the process flow. Patterns can also be used to implement optimum design configurations, improving design flow efficiency while ensuring manufacturability. Desirable or proven patterns can be implemented by designers with confidence that they will pass verification. Not only are design patterns an easier way to express complex 2-D and 3-D relationships, but they provide a directly useful way for design and manufacturing engineers to communicate design for manufacturing issues.

Pattern matching techniques have also been applied in the test and diagnosis area recently. Chip testing and failure diagnosis plays an important role in improving the yield of an IC design. Achieving high and stable yields helps ensure that the product is profitable and meets quality and reliability objectives. When a new manufacturing process is introduced, or a new product is introduced on a mature manufacturing process, yields will tend to be significantly lower than acceptable. The ability to meet profitability and quality objectives, and perhaps more importantly, time to market and time to volume objectives depend greatly on the rate at which these low yields can be ramped up.

Traditionally, logic-based scan test diagnosis, a software-based technique, uses structural test patterns and the design description to identify defect suspects. Physical failure analysis is then performed to locate defects and to identify the root-cause of failure. There is, however, a gap between what a traditional logic-based diagnosis tool can deliver and what failure analysis and yield engineers need. This is mainly because typically more than one physical location can explain the defective logical behavior observed in the failing cycles and each suspect location will often have multiple possible root causes associated with it. Fortunately, many systematic failures are caused by specific layout patterns. Matching traditional diagnosis results with layout patterns can thus improve the accuracy and resolution of a diagnosis tool, bridge the gap and speed up the yield ramp process. This type of approach is often referred to as pattern-aware (or layout-aware) diagnosis/yield analysis.

In both of the pattern-aware physical verification and pattern-aware failure diagnosis/yield analysis areas, it is desirable to group layout patterns together if they are identical, rotation variants, mirror variants, translation variants and/or scale variants. One reason is that these variants represent the same layout features that may be difficult to fabricate on a chip and/or prone to be defective on a fabricated chip. Another reason is that the grouping can reduce the storage requirement and computation costs for various simulation and analysis tools.

BRIEF SUMMARY OF THE DISCLOSED TECHNOLOGY

Aspects of the disclosed technology relate to techniques for determining canonical forms of layout patterns. In one aspect, there is a method comprising: transforming coordinates of vertices of geometric elements in a window of a layout design into new coordinates of the vertices, wherein the coordinates of vertices do not comprise clipped coordinates and the transforming comprises: performing a translation on the coordinates of vertices based on differences between maximum and minimum X coordinate values of the vertices and between maximum and minimum Y coordinate values of the vertices (the clipped coordinate values not considered); and determining a canonical form of the geometric elements based on a sum of X coordinate values of the new coordinates of the vertices and a sum of Y coordinate values of the new coordinates of the vertices.

The performing a translation may comprise: determining an origin of a new coordinate system based on differences between maximum and minimum X coordinate values of the vertices and between maximum and minimum Y coordinate values of the vertices.

The transforming may further comprise: scaling down the translated coordinates by a factor if the factor is greater than 1, wherein the factor is a greatest common factor of the translated coordinates of the vertices.

With various implementations of the disclosed technology, the method may further comprise: determining canonical form coordinates of the vertices based on a relationship between the canonical form and an original form of the geometrical elements; and sorting the canonical form coordinates according to a predetermined rule. The sorted canonical form coordinates may be used for pattern matching.

According to some embodiments of the disclosed technology, the canonical form of the geometric elements is obtained by performing an operation on the geometric elements, wherein the operation is one of symmetry operations comprising: identity operation, 90-degree-rotation operation, 180-degree-rotation operation, 270-degree-rotation operation, mirror-reflection operation, 90-degree-rotation mirror-reflection operation, 180-degree-rotation mirror-reflection operation, and 270-degree-rotation mirror-reflection operation.

In another aspect, there are one or more non-transitory processor-readable media storing processor-executable instructions for causing one or more processors to perform a method, the method comprising: transforming coordinates of vertices of geometric elements in a window of a layout design into new coordinates of the vertices, wherein the coordinates of vertices do not comprise clipped coordinates and the transforming comprises: performing a translation on the coordinates of vertices based on differences between maximum and minimum X coordinate values of the vertices and between maximum and minimum Y coordinate values of the vertices (the clipped coordinate values not considered); and determining a canonical form of the geometric elements based on a sum of X coordinate values of the new coordinates of the vertices and a sum of Y coordinate values of the new coordinates of the vertices.

In still another aspect, there is a system, comprising: a transformation unit configured to transform coordinates of vertices of geometric elements in a window of a layout design into new coordinates of the vertices, wherein the coordinates of vertices do not comprise clipped coordinates and the transforming comprises: performing a translation on the coordinates of vertices based on differences between maximum and minimum X coordinate values of the vertices and between maximum and minimum Y coordinate values of the vertices (the clipped coordinate values not considered); and a canonical form determination unit configured to determine a canonical form of the geometric elements based on a sum of X coordinate values of the new coordinates of the vertices and a sum of Y coordinate values of the new coordinates of the vertices.

The system may further comprises a canonical form coordinates determination and sorting unit configured to determine canonical form coordinates of the vertices based on a relationship between the canonical form and an original form of the geometrical elements and to sort the canonical form coordinates according to a predetermined rule. The system may still further comprise a pattern matching unit configured to perform pattern matching using the sorted canonical form coordinates.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 3b illustrates a 90-degree-clock-wise rotation variant of the layout pattern in FIG. 3a.

FIG. 3c illustrates a 180-degree-clock-wise rotation variant of the layout pattern in FIG. 3a.

FIG. 3d illustrates a 270-degree-clock-wise rotation variant of the layout pattern in FIG. 3a.

FIG. 3e illustrates a mirror variant of the layout pattern in FIG. 3a.

DETAILED DESCRIPTION OF THE DISCLOSED TECHNOLOGY

General Considerations

Figure 1:
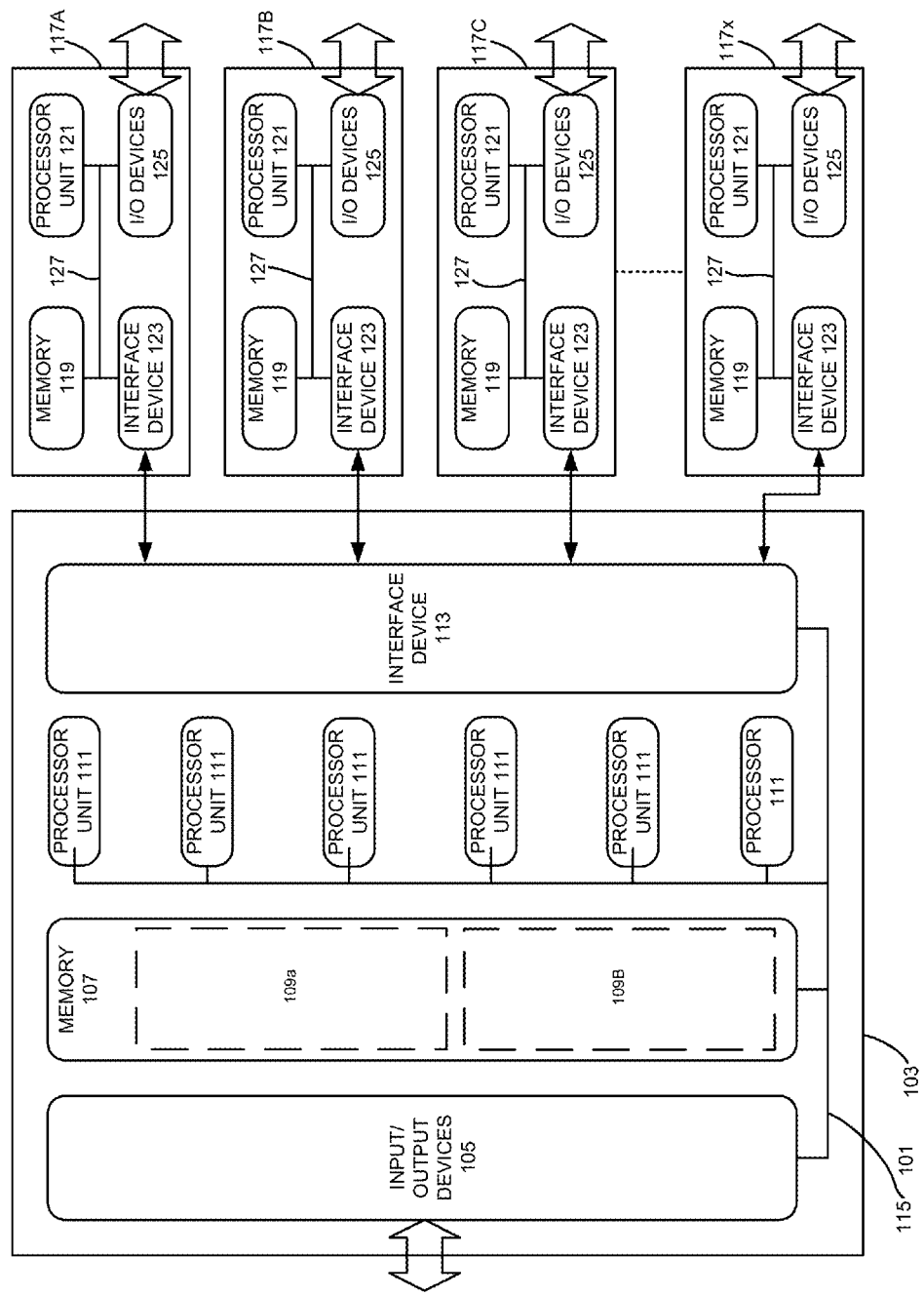
FIG. 1 illustrates an example of a computing system that may be used to implement various embodiments of the disclosed technology.

Various aspects of the present disclosed technology relate to techniques for determining canonical forms of layout patterns. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine", "transform" and "perform" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of concurrently running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
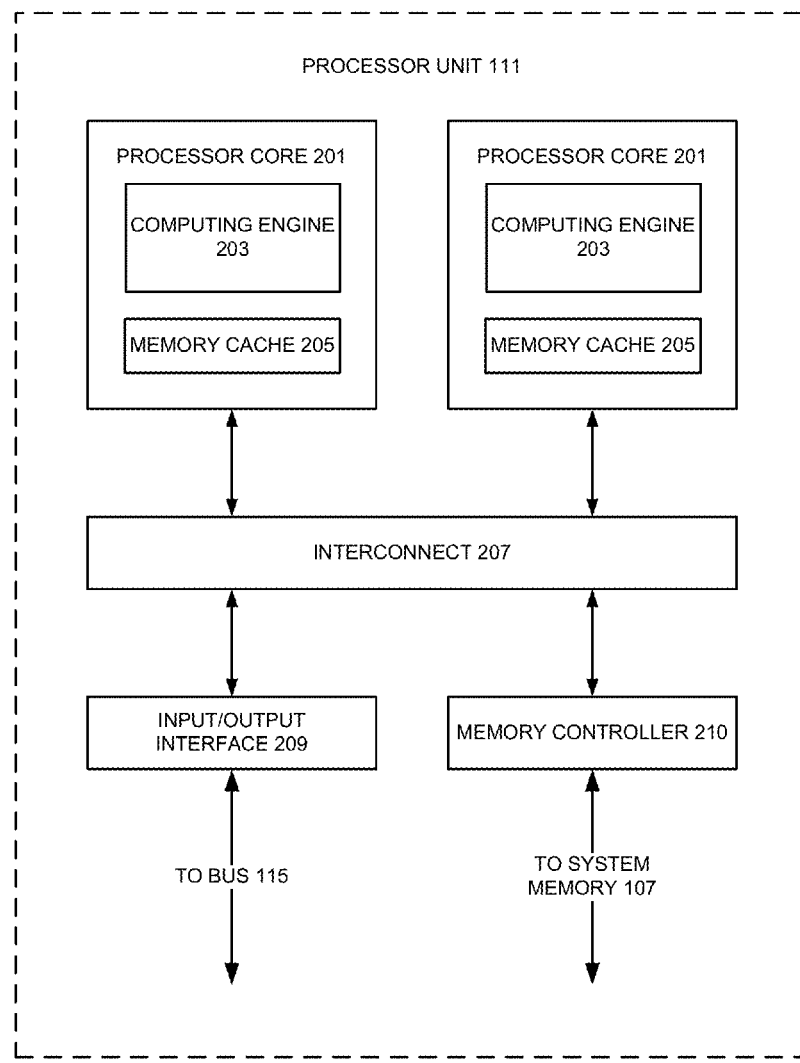
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Transformation Variants

As noted previously, transformations of a layout pattern usually will not affect whether the layout pattern is difficult to fabricate or whether the layout pattern is prone to be defective after fabrication. The results of transformations are referred to as transformation variants. These transformation variants may be treated as the same pattern in physical verification and diagnosis/yield analysis. Common transformation variants comprise translation (shift) variants, rotation variants, and mirror reflection variants. Some transformation variants may be derived through a combination of various basic transformations. In some situations, transformation variants also comprise scaling variants.

Figure 3A:
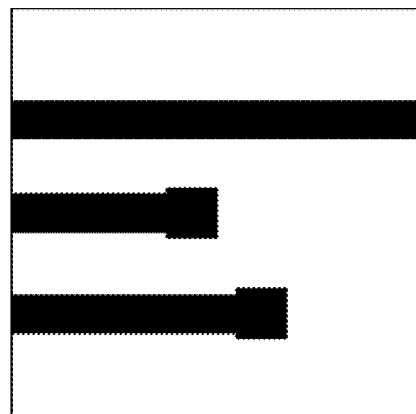
FIG. 3a illustrates an example of a layout pattern.
Figure 3B:
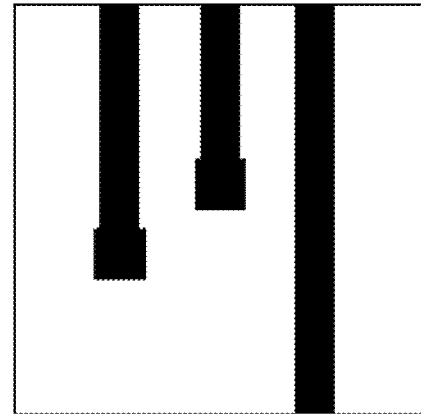
Figure 3C:
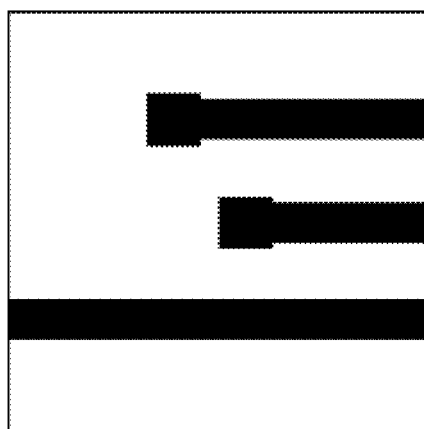
Figure 3D:
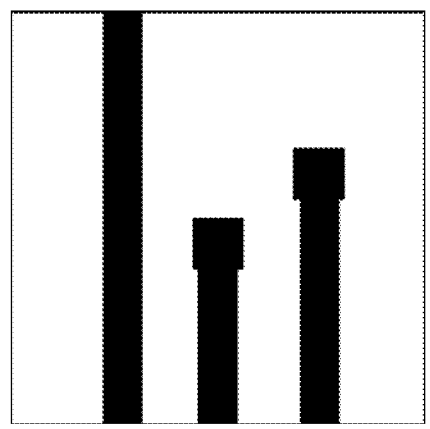
Figure 3E:
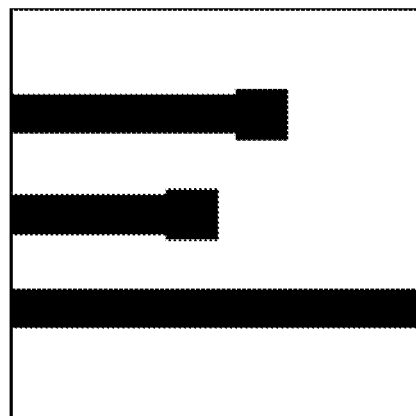
Figure 3F:
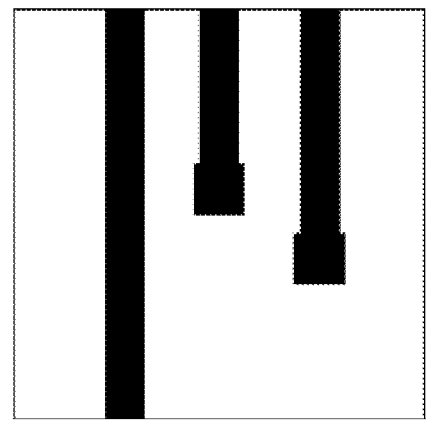
FIG. 3f illustrates a 90-degree-clock-wise rotation variant of the layout pattern in FIG. 3e.
Figure 3G:
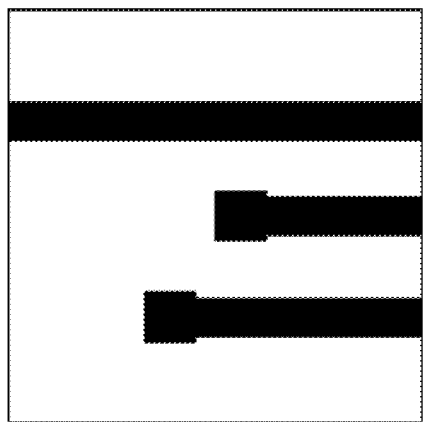
FIG. 3g illustrates a 180-degree-clock-wise rotation variant of the layout pattern in FIG. 3e.
Figure 3H:
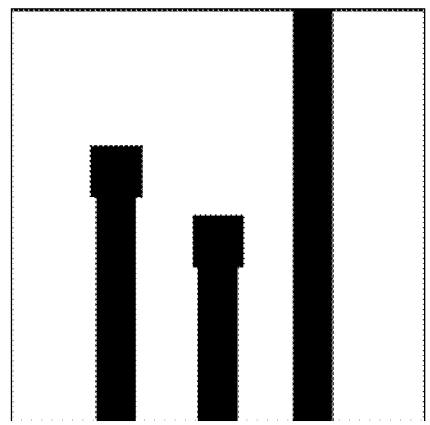
FIG. 3h illustrates a 270-degree-clock-wise rotation variant of the layout pattern in FIG. 3e.

Layout designs usually comprise Manhattan patterns: edges of polygons are parallel to either the X axis or the Y axis. In a Manhattan-style layout design, a layout pattern has 8 mirror/rotation variants (including the original), as illustrated in FIGS. 3a-h. Specifically, FIG. 3a illustrates a layout pattern 300; FIG. 3b illustrates a rotation variant obtained by rotating the layout pattern 300 90 degree clock-wise, FIG. 3c illustrates a rotation variant obtained by rotating the layout pattern 300 180 degree clock-wise, FIG. 3d illustrates a rotation variant obtained by rotating the layout pattern 300 270 degree clock-wise, FIG. 3e illustrates a mirror variant obtained by mirror transformation of the layout pattern 300, FIG. 3f illustrates a mirror-rotation variant obtained by a combination of mirror transformation and 90-degree-clockwise rotation, FIG. 3g illustrates a mirror-rotation variant obtained by a combination of mirror transformation and 180-degree-clockwise rotation, and FIG. 3h illustrates a mirror-rotation variant obtained by a combination of mirror transformation and 270-degree-clockwise rotation.

Geometric elements in a layout design may be described by X and Y coordinates. Without loss of generality, assume that the origin of the coordinate system is at the center of the pattern and its variants. The 90-degree-clockwise rotation variant in FIG. 3b may be obtained by changing coordinates of the original pattern in FIG. 3a as follows: (x, y)->(y, −x). Similarly, (x, y)->(−x, −y) will get FIG. 3c; (x, y)->(−y, x) will get FIG. 3d, (x, y)->(x, −y) will get FIG. 3e; (x, y)->(−y, −x) will get FIG. 3f; (x, y)->(−x, y) will get FIG. 3g; and (x, y)->(y, x) will get FIG. 3h.

Figure 4A:
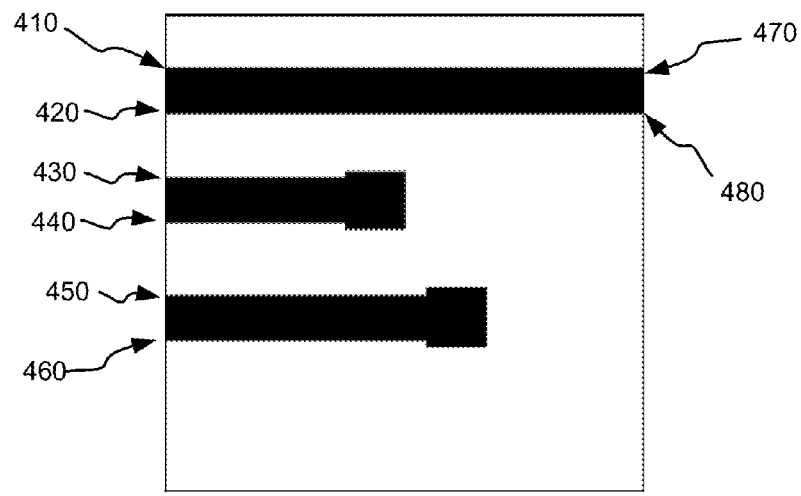
FIG. 4a illustrates a layout pattern obtained by shifting the layout pattern in FIG. 3a vertically.
Figure 4B:
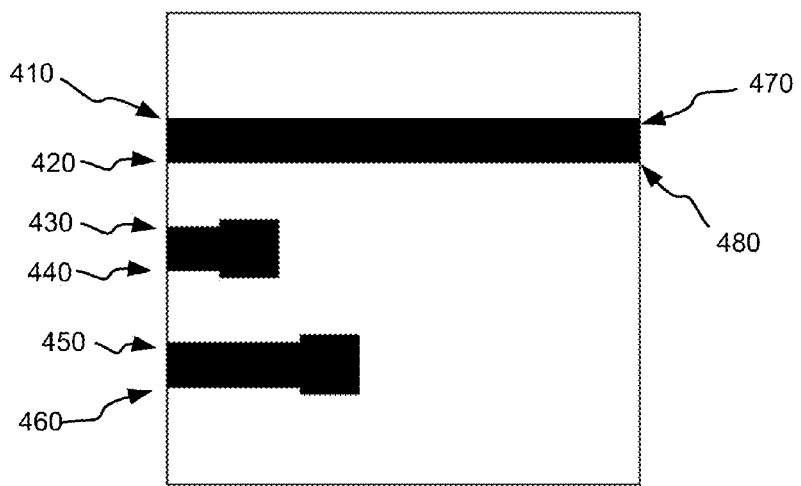
FIG. 4b illustrates a layout pattern obtained by shifting the layout pattern in FIG. 3a horizontally.

FIGS. 4a and 4b illustrates two translation (shifts) variants of the layout pattern 300. These translation variants have the same number (eight) of X clipped coordinates as the original pattern and all of non-clipped coordinates of vertices (twelve in total) are the same after a translation operation. In this disclosure, a clipped coordinate is defined as a coordinate for a boundary line of the window: an X coordinate for a vertical boundary line or a Y coordinate for a horizontal boundary line. In FIGS. 4a and 4b, the X coordinates for vertices 410-480 are clipped coordinates.

Canonical Form Determination Tools and Methods

Figure 5:
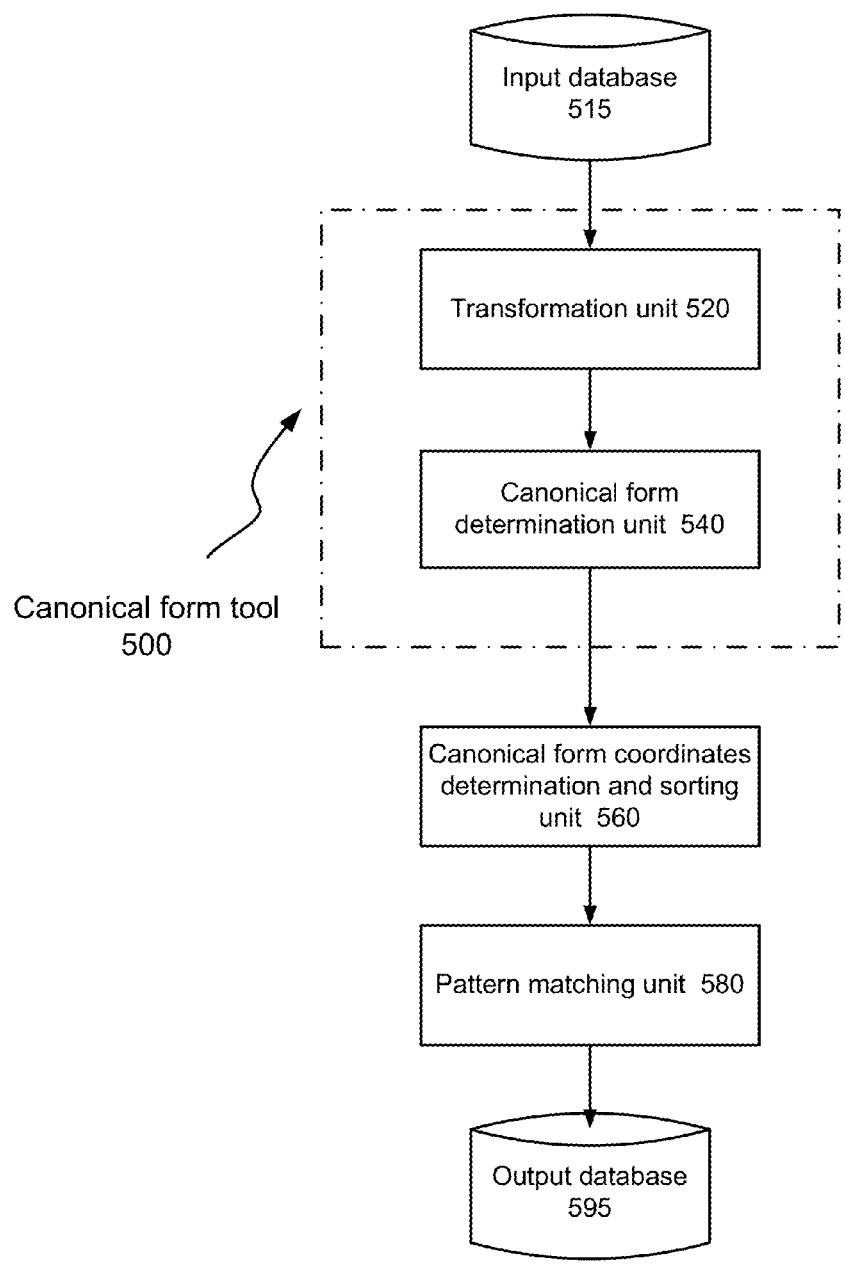
FIG. 5 illustrates an example of a canonical form tool according to various embodiments of the disclosed technology.

FIG. 5 illustrates an example of a canonical form tool according to various embodiments of the disclosed technology. As seen in the figure, the canonical form tool 500 comprises two units: a transformation unit 520 and a canonical form determination unit 540. Some implementations of the canonical form tool 500 may cooperate with (or incorporate) one or more of an input database 515, an output database 595, a canonical form coordinates determination and sorting unit 560, and a pattern matching unit 580.

As will be discussed in more detail below, the transformation unit 520 transforms coordinates of vertices of geometric elements in a window of a layout design into new coordinates of the vertices. The transformation comprises performing a translation on the coordinates of vertices based on differences between maximum and minimum X coordinate values of the vertices and between maximum and minimum Y coordinate values of the vertices. Based on a sum of X coordinate values of and a sum of Y coordinate values of the new coordinates of the vertices, the canonical form determination unit 540 determines a canonical form of the geometric elements. The canonical form coordinates determination and sorting unit 560 then determines canonical form coordinates of the vertices based on a relationship between the canonical form and an original form of the geometrical elements and sorts the canonical form coordinates according to a predetermined rule. Using the sorted canonical form coordinates, the pattern matching unit 580 performs pattern matching.

As previously noted, various examples of the disclosed technology may be implemented by a multiprocessor computing system, such as the computing system illustrated in FIGS. 1 and 2. Accordingly, one or more of the transformation unit 520, the canonical form determination unit 540, the canonical form coordinates determination and sorting unit 560, and the pattern matching unit 580 may be implemented by executing programming instructions on one or more processors in a computing system such as the computing system illustrated in FIG. 1 and FIG. 2. Correspondingly, some other embodiments of the disclosed technology may be implemented by software instructions, stored on a non-transitory computer-readable medium, for instructing one or more programmable computers/computer systems to perform the functions of one or more of the transformation unit 520, the canonical form determination unit 540, the canonical form coordinates determination and sorting unit 560, and the pattern matching unit 580. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

It also should be appreciated that, while the transformation unit 520, the canonical form determination unit 540, the canonical form coordinates determination and sorting unit 560, and the pattern matching unit 580 are shown as separate units in FIG. 5, a single servant computer (or a single processor within a master computer) may be used to implement two or more of these units at different times, or components of two or more of these units at different times.

With various examples of the disclosed technology, the input database 515 and the output database 595 may be implemented using any suitable computer readable storage device. That is, either of the input database 515 and the output database 595 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 515 and the output database 595 are shown as separate units in FIG. 5, a single data storage medium may be used to implement some or all of these databases.

Figure 6:
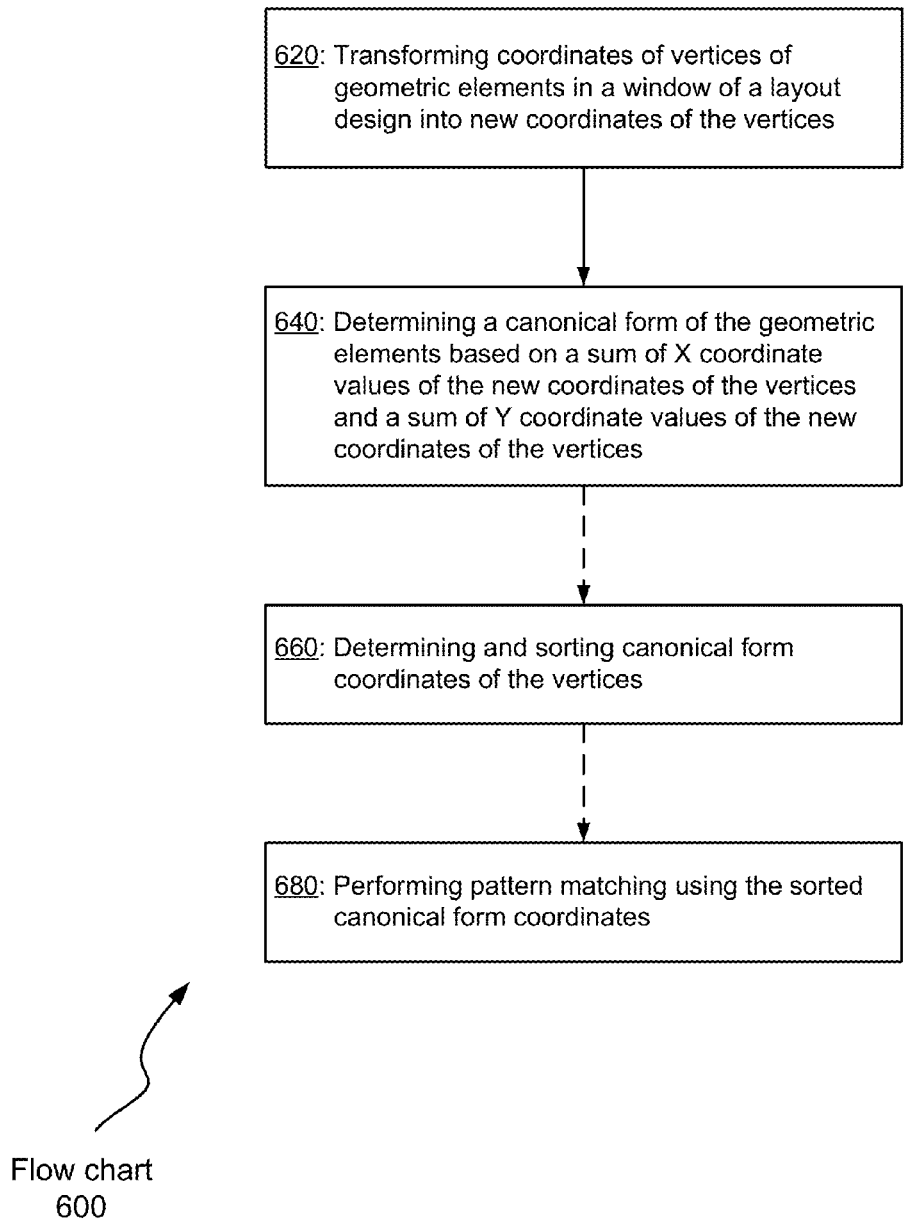
FIG. 6 illustrates a flowchart showing a process for determining canonical forms of layout patterns that may be implemented according to various examples of the disclosed technology.

FIG. 6 illustrates a flowchart showing a process for determining canonical forms of layout patterns that may be implemented according to various examples of the disclosed technology. For ease of understanding, methods for determining canonical forms of layout patterns that may be employed according to various embodiments of the disclosed technology will be described with reference to the canonical form tool 500 illustrated in FIG. 5 and the flow chart 600 in FIG. 6. It should be appreciated, however, that alternate implementations of a canonical form tool may be used to perform the method for determining canonical forms of layout patterns shown in the flow chart 600 according to various embodiments of the disclosed technology. In addition, it should be appreciated that implementations of the canonical form tool 500 may be employed to implement methods for determining canonical forms of layout patterns according to different embodiments of the disclosed technology other than the one illustrated by the flow chart 600 in FIG. 6.

Initially, in operation 620 of the flow chart 600, the transformation unit 520 transforms coordinates of vertices of geometric elements in a window of a layout design into new coordinates of the vertices. The window, sometimes also referred to as a snippet, often has a square shape as shown in FIGS. 3-4. The transformation comprises performing a translation on the coordinates of vertices based on differences between maximum and minimum X coordinate values of the vertices and between maximum and minimum Y coordinate values of the vertices. The clipped coordinates are not transformed or considered when maximum and minimum X/Y coordinate values of the vertices are determined.

The translation operation may comprise determining an origin (shift center) of a new coordinate system based on differences between maximum and minimum X coordinate values (maxX and minX) of the vertices and between maximum and minimum Y coordinate values (maxY and minY) of the vertices. The X and Y coordinate values of the origin in the original coordinate system (shiftX, shifty) may be calculated as: shiftX=(maxX+minX)/2 and shiftY=(maxY+minY)/2. If there are no non-clipped X coordinates, maxX and minX are set to be zero. The same rule applies to Y coordinates. To translate coordinates of the vertices, shiftX and shiftY are subtracted from non-clipped X coordinate values and non-clipped Y coordinate values.

In addition to the translation operation, the transformation may also comprise a scaling operation: the translated coordinates are scaled down by a factor if the factor is greater than 1, wherein the factor is a greatest common factor of the translated coordinates of the vertices.

Next, in operation 640, the canonical form determination unit 540 determines a canonical form of the geometric elements based on a sum of X coordinate values of the new coordinates of the vertices and a sum of Y coordinate values of the new coordinates of the vertices. As discussed previously, in a Manhattan-style layout design, a layout pattern has 8 mirror/rotation variants (including the original), as illustrated in FIGS. 3*a-h*. Assume $SumX_0$ and $SumY_0$ are value of the sum of X coordinate values and value of the sum of Y coordinate values for the original pattern. The sums of X/Y coordinates for the other seven mirror/rotation variants can be derived from $SumX_0$ and $SumY_0$:

clockwise-90-degree: t=1; $SumX_t=SumY_0$; $SumY_t=-SumX_0$ clockwise-180-degree: t=2; $SumX_t=-SumX_0$; $SumY_t=-SumY_0$ clockwise-270-degree: t=3; $SumX_t=-SumY_0$; $SumY_t=SumX_0$ mirror-Y: t=4; $SumX_t=-SumX_0$; $SumY_t=SumY_0$ mirror-Y, mirror-Y-clockwise-90-degree: t=5; $SumX_t=SumY_0$; $SumY_t=SumX_0$ mirror-Y-clockwise-180-degree: t=6; $SumX_t=SumX_0$; $SumY_t=-SumY_0$ mirror-Y-clockwise-270-degree: t=7; $SumX_t=-SumY_0$; $SumY_t=-SumX_0$ Among these eight forms, anyone can be designated as the canonical form. For example, the canonical form may be defined as a variant that satisfies the rule: $SumX_t \geq 0$, $SumY_t \geq 0$ and $SumX_t \geq SumY_t$. By nature of the geometry orientation, there exists at least one of the eight variants that satisfies this rule. If SumY is 0, there are 2 variations can satisfy the rule. If both SumX and SumY are 0, all 8 variations can satisfy the rule. By estimate, more than 90% patterns have only one variation satisfies the rule. When more than one variant satisfy the rule, sometimes an additional rule may be needed to identify the canonical form as discussed below.

Figure 7A:
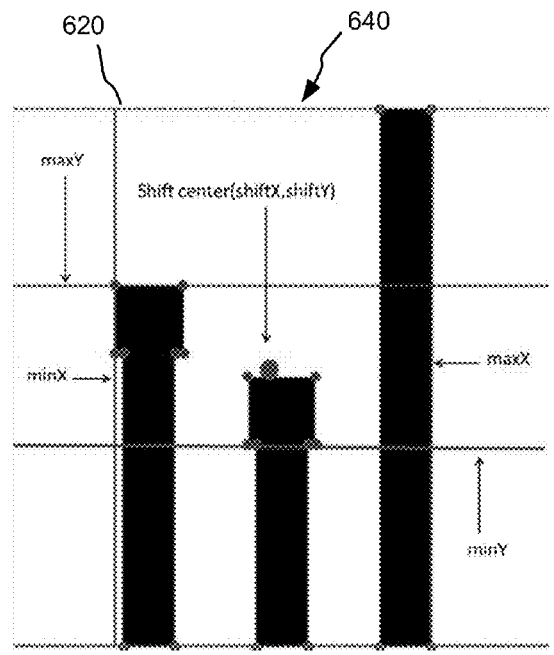
FIG. 7a illustrates a pattern and the shift center for the pattern.
Figure 7B:
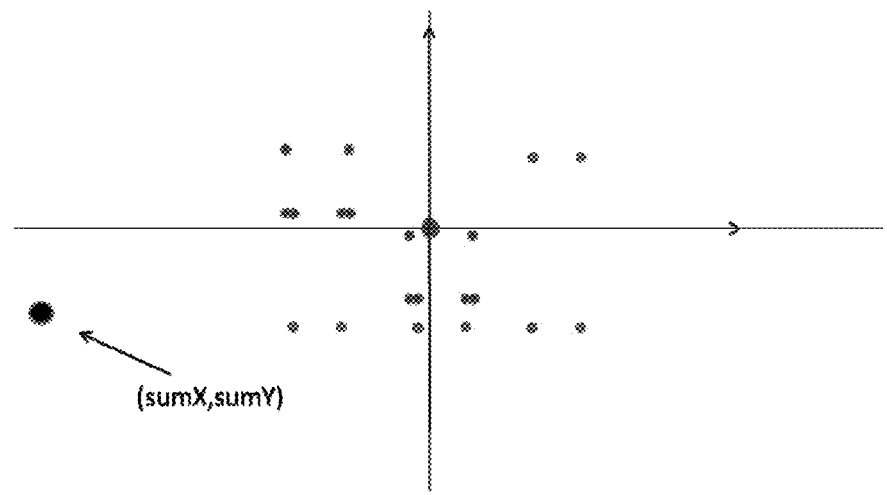
FIG. 7b illustrates coordinates of the vertices of the pattern in FIG. 7a and SumX and SumY.
Figure 7C:
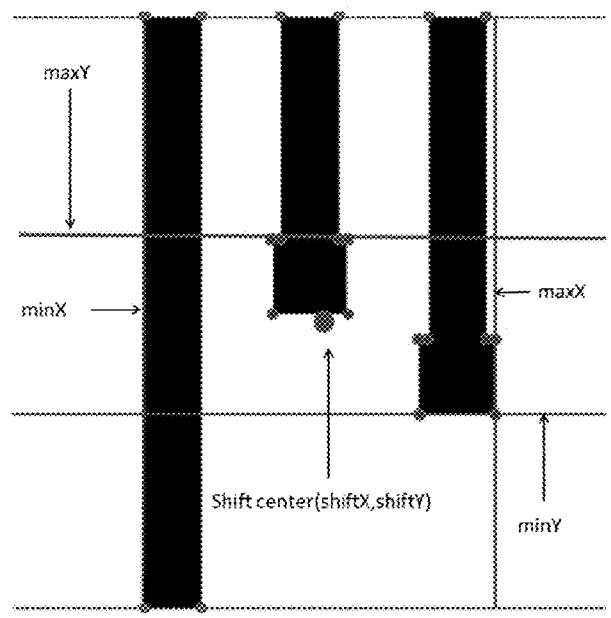
FIG. 7c illustrates a pattern obtained by rotating the pattern in FIG. 7a 180 degree clock-wise and its shift center.
Figure 7D:
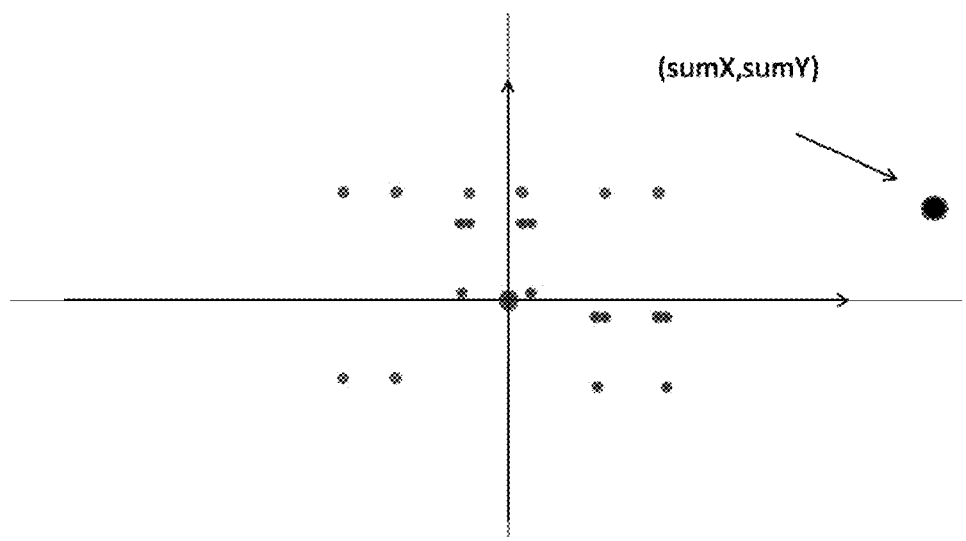
FIG. 7d illustrates coordinates of the vertices of the pattern in FIG. 7c and SumX and SumY.

FIG. 7*a* illustrates a pattern and the shift center, and FIG. 7*b* illustrates coordinates of the vertices and SumX and SumY. In FIG. 7*a*, Y coordinates for eight vertices are clipped vertices and thus are not considered for the determination of the shift center and SumX and SumY. As shown in FIG. 7*b*, SumX and SumY are both negative and (−SumX)>(−SumY). According to the rule in the above example, this pattern is not the canonical form. The Canonical form is a variant that changes signs of both SumX and SumY—the clockwise-180-degree variant. FIG. 7*c* illustrates the canonical form of the pattern in FIG. 7*a* and the shift center, and FIG. 7*d* illustrates coordinates of the vertices of the canonical form and SumX and SumY.

With some embodiments of the disclosed technology, two further operations are performed as shown in FIG. 6. In operation 660, the canonical form coordinates determination and sorting unit 560 determines canonical form coordinates of the vertices based on a relationship between the canonical form and an original form of the geometrical elements; and sorts the canonical form coordinates according to a predetermined rule. In the example shown in FIG. 7*a*, the relationship between the canonical form and the original form is a rotation of clockwise-180-degree. Accordingly, canonical form coordinates can be obtained by changing signs of the coordinate values.

One example of the predetermined rule for sorting is: the vertex with largest X, and then largest Y is selected as the starting point of each polygon; then polygons within the pattern are sorted based on their starting vertices; and coordinates are converted into one array of integers. The number of polygons and the number of vertices of each polygon may be appended to the array. When two variants both satisfy the canonical rule, the above obtained array may be used to identify the final canonical form.

In operation 680, the pattern matching unit 580 performs pattern matching using the sorted canonical form coordinates. If two patterns have an identical array, they may be designated as identical patterns.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A method, executed by at least one processor of a computer, comprising:
    transforming coordinates of vertices of geometric elements in a window of a layout design into new coordinates of the vertices, wherein the coordinates of vertices do not comprise clipped coordinates and the transforming comprises:
        performing a translation on the coordinates of vertices based on differences between maximum and minimum X coordinate values of the vertices and between maximum and minimum Y coordinate values of the vertices (the clipped coordinate values not considered); and
    determining a canonical form of the geometric elements based on a sum of X coordinate values of the new coordinates of the vertices and a sum of Y coordinate values of the new coordinates of the vertices.

2. The method recited in claim 1, wherein the performing comprises:
    determining an origin of a new coordinate system based on differences between maximum and minimum X coordinate values of the vertices and between maximum and minimum Y coordinate values of the vertices.

3. The method recited in claim 1, wherein the transforming further comprises:
    scaling down the translated coordinates by a factor if the factor is greater than 1, wherein the factor is a greatest common factor of the translated coordinates of the vertices.

4. The method recited in claim 1, further comprising:
    determining canonical form coordinates of the vertices based on a relationship between the canonical form and an original form of the geometrical elements; and
    sorting the canonical form coordinates according to a predetermined rule.

5. The method recited in claim 4, further comprising:
    performing pattern matching using the sorted canonical form coordinates.

6. The method recited in claim 1, wherein the canonical form of the geometric elements is obtained by performing an operation on the geometric elements, wherein the operation is one of symmetry operations comprising: identity operation, 90-degree-rotation operation, 180-degree-rotation operation, 270-degree-rotation operation, mirror-reflection operation, 90-degree-rotation mirror-reflection operation, 180-degree-rotation mirror-reflection operation, and 270-degree-rotation mirror-reflection operation.

7. One or more non-transitory computer-readable media storing computer-executable instructions for causing one or more processors to perform a method, the method comprising:
    transforming coordinates of vertices of geometric elements in a window of a layout design into new coordinates of the vertices, wherein the coordinates of vertices do not comprise clipped coordinates and the transforming comprises:
        performing a translation on the coordinates of vertices based on differences between maximum and minimum X coordinate values of the vertices and between maximum and minimum Y coordinate values of the vertices (the clipped coordinate values not considered); and
    determining a canonical form of the geometric elements based on a sum of X coordinate values of the new coordinates of the vertices and a sum of Y coordinate values of the new coordinates of the vertices.

8. The one or more non-transitory computer-readable media recited in claim 7, wherein the performing comprises:
    determining an origin of a new coordinate system based on differences between maximum and minimum X coordinate values of the vertices and between maximum and minimum Y coordinate values of the vertices.

9. The one or more non-transitory computer-readable media recited in claim 7, wherein the transforming further comprises:
    scaling down the translated coordinates by a factor if the factor is greater than 1, wherein the factor is a greatest common factor of the translated coordinates of the vertices.

10. The one or more non-transitory computer-readable media recited in claim 7, wherein the method further comprises:
    determining canonical form coordinates of the vertices based on a relationship between the canonical form and an original form of the geometrical elements; and
    sorting the canonical form coordinates according to a predetermined rule.

11. The one or more non-transitory computer-readable media recited in claim 10, wherein the method further comprises:
    performing pattern matching using the sorted canonical form coordinates.

12. The one or more non-transitory computer-readable media recited in claim 7, wherein the canonical form of the geometric elements is obtained by performing an operation on the geometric elements, wherein the operation is one of symmetry operations comprising: identity operation, 90-degree-rotation operation, 180-degree-rotation operation, 270-degree-rotation operation, mirror-reflection operation, 90-degree-rotation mirror-reflection operation, 180-degree-rotation mirror-reflection operation, and 270-degree-rotation mirror-reflection operation.

13. A system, comprising:

a transformation unit configured to transform coordinates of vertices of geometric elements in a window of a layout design into new coordinates of the vertices, wherein the coordinates of vertices do not comprise clipped coordinates and the transforming comprises: performing a translation on the coordinates of vertices based on differences between maximum and minimum X coordinate values of the vertices and between maximum and minimum Y coordinate values of the vertices (the clipped coordinate values not considered); and a canonical form determination unit configured to determine a canonical form of the geometric elements based on a sum of X coordinate values of the new coordinates of the vertices and a sum of Y coordinate values of the new coordinates of the vertices.

14. The system recited in claim 13, further comprises:

a canonical form coordinates determination and sorting unit configured to determine canonical form coordinates of the vertices based on a relationship between the canonical form and an original form of the geometrical elements and to sort the canonical form coordinates according to a predetermined rule.

15. The system recited in claim 14, further comprising:

a pattern matching unit configured to perform pattern matching using the sorted canonical form coordinates.

16. The system recited in claim 13, wherein the performing comprises:

determining an origin of a new coordinate system based on differences between maximum and minimum X coordinate values of the vertices and between maximum and minimum Y coordinate values of the vertices.

17. The system recited in claim 13, wherein the transforming further comprises:

scaling down the translated coordinates by a factor if the factor is greater than 1, wherein the factor is a greatest common factor of the translated coordinates of the vertices.

18. The system recited in claim 13, wherein the canonical form of the geometric elements is obtained by performing an operation on the geometric elements, wherein the operation is one of symmetry operations comprising: identity operation, 90-degree-rotation operation, 180-degree-rotation operation, 270-degree-rotation operation, mirror-reflection operation, 90-degree-rotation mirror-reflection operation, 180-degree-rotation mirror-reflection operation, and 270-degree-rotation mirror-reflection operation.

* * * * *